(12) United States Patent
Burte

(10) Patent No.: US 10,338,585 B2
(45) Date of Patent: Jul. 2, 2019

(54) ABNORMAL AIRCRAFT RESPONSE MONITOR

(71) Applicant: Bombardier Inc., Dorval (CA)

(72) Inventor: Gregory Burte, Verdun (CA)

(73) Assignees: BOMBARDIER INC., Dorval, QC (CA); C SERIES AIRCRAFT LIMITED PARTNERSHIP, Mirabel, QC (CA)

( * ) Notice: Subject to any disclaimer, the term of this patent is extended or adjusted under 35 U.S.C. 154(b) by 0 days.

(21) Appl. No.: 14/912,748

(22) PCT Filed: Aug. 18, 2014

(86) PCT No.: PCT/IB2014/063956
§ 371 (c)(1),
(2) Date: Feb. 18, 2016

(87) PCT Pub. No.: WO2015/025262
PCT Pub. Date: Feb. 26, 2015

(65) Prior Publication Data
US 2016/0202701 A1 Jul. 14, 2016

Related U.S. Application Data

(60) Provisional application No. 61/869,089, filed on Aug. 23, 2013.

(51) Int. Cl.
*G05D 1/00* (2006.01)
*B64C 13/50* (2006.01)

(52) U.S. Cl.
CPC .......... *G05D 1/0077* (2013.01); *B64C 13/503* (2013.01)

(58) Field of Classification Search
None
See application file for complete search history.

(56) References Cited

U.S. PATENT DOCUMENTS 7,877,627 B1 1/2011 Freydel
2006/0087967 A1 4/2006 Landwehr et al.
(Continued)

FOREIGN PATENT DOCUMENTS

CN 102126552 A 7/2011
CN 102736630 A 10/2012
(Continued)

OTHER PUBLICATIONS

Chinese Patent Office; Office Action dated Nov. 2, 2016 re: Chinese Patent Application No. 201480046651.2.
(Continued)

*Primary Examiner* — John Olszewski
*Assistant Examiner* — Gerrad A Foster
(74) *Attorney, Agent, or Firm* — Norton Rose Fulbright Canada LLP; Tamara O'Connell

(57) ABSTRACT

An aircraft flight control system includes at least two flight control computers at least one of which is utilized at any one time to control aircraft flight, each of the at least two flight control computers having at least two processors, each processor being responsive to an aircraft input signal indicative of at least one of a plurality of aircraft flight parameters and being responsive to control laws to provide a control output command signal indicative of a desired control of an aircraft flight control surface. Also, at least one of the at least two processors for each of the at least two flight control computers comprises an abnormal response monitor that is responsive to at least one aircraft input signal indicative of at least one of a plurality of aircraft flight parameters to determine whether the control output command signal is within an acceptable value.

18 Claims, 2 Drawing Sheets

(56) References Cited

U.S. PATENT DOCUMENTS

| 2007/0164166 | A1* | 7/2007 | Hirvonen | B64C 13/42 |
| | | | | 244/175 |
| 2010/0222943 | A1 | 9/2010 | Sghairi et al. | |
| 2011/0040430 | A1* | 2/2011 | Tessier | G01C 21/16 |
| | | | | 701/3 |
| 2011/0066305 | A1* | 3/2011 | Lin | B64C 13/503 |
| | | | | 701/3 |

FOREIGN PATENT DOCUMENTS

| EP | 2216245 A1 | 8/2010 |
| EP | 2343613 A2 | 7/2011 |
| WO | 2008122820 A2 | 10/2008 |

OTHER PUBLICATIONS

English translation of Chinese patent document No. CN 102126552A dated Jul. 20, 2011; www.googlepatents.ca/patents . . . .
PCT international Search Report and Written Opinion dated Nov. 28, 2014 re: International Application No. PCT/IB2014/063956.
English translation of the specification of Patent Application No. CN 102736630 dated Oct. 17, 2012.
English translation of the specification of EP 2 216 245 A1 dated Aug. 11, 2010.
Chinese Patent Office; Second Office Action dated Jul. 21, 2017 re: Chinese Patent Application No. 201480046651.2.
The State Intellectual Property Office of the People's Republic of China; Notification of the Third Office Action dated Feb. 14, 2018 re: Chinese Patent Application No. 201480046651.2.
European Patent Office, Communication pursuant to Article 94(3) EPC dated May 23, 2018 re: European Patent Application No. 14 758 424.7.

* cited by examiner

ABNORMAL AIRCRAFT RESPONSE MONITOR

CROSS-REFERENCE TO RELATED APPLICATION

This application is a national phase application under 35 U.S.C. 371 of International Patent Application No. PCT/IB2014/063956 filed on Aug. 18, 2014, which claims priority from U.S. Provisional Patent Application Ser. No. 61/869,089, filed on Aug. 23, 2013, the entire content of which is incorporated herein by reference.

FIELD OF THE INVENTION

The present invention relates in general to an aircraft flight control system, and in particular to an aircraft flight control system that monitors various sensed actual input signal values and/or pilot commanded input signal values of each of more than one aircraft flight parameter using one of at least two different flight system computer channels or lanes to check for abnormal flight system computer operation in the form of a residual software error in the commanded output signal for each of the more than one aircraft flight parameter.

BACKGROUND OF THE INVENTION

Fly-by-wire ("FBW") aircraft flight control systems are increasingly becoming the preferred type of flight control system for modern aircraft. The FBW type of control system replaces the relatively heavier and more error prone mechanical and hydro-mechanical types of flight control systems.

A FBW flight control system commonly comprises a computer system interposed between: (1) the flight control inputs given both automatically by various aircraft component sensors and subsystems such as the autopilot and manually by the pilots via, e.g., sidestick or yoke controllers, switches, levers, etc.; and (2) the aircraft flight control surfaces and other devices that ultimately control the operation and direction of the aircraft in flight. That is, the inputs from the pilots and the sensors are not connected directly to the aircraft flight control surfaces to be controlled (e.g., ailerons, rudder, elevators, spoilers, slats, flaps, etc.). Instead, the pilot and sensor inputs are routed to a computer system (e.g., typically comprising more than one computer or data processor device for safety redundancy purposes) that contains the flight control logic which interprets the sensor and pilot inputs and outputs flight control surface position commands that move the aircraft flight control surfaces according to control laws ("CLAWS") stored in the computer system to effect changes in the aircraft's pitch, roll, yaw, altitude, etc., for example. In the alternative, the computer system can be replaced partly or entirely with analog electronic circuits to achieve the same result. However, the clear trend is to use digital computers that contain the control laws and the input and the output processing logic and which are interposed between the various inputs and the output actuators associated with their respective aircraft flight control surfaces.

FBW control systems represent a relatively large weight savings (and, thus, significantly reduced fuel costs) on the aircraft as compared to the traditional mechanical or hydro-mechanical flight control systems. This is due to the relatively heavy and bulky cables and associated mechanical components of the traditional systems being replaced by wires and relatively simple actuators. Other advantages of FBW systems include a reduction in the workload of the pilots, reduced maintenance time and costs, and increased flight safety as the flight control laws and overall flight envelope can be more precisely tailored to the pilot sidestick or yoke control input devices and the sensor input signals. The FBW control system also commonly allows for "automatic pilot" operation of the aircraft in certain flight situations as the flight control computer is typically responsive to various sensor inputs and directs the aircraft flight control surfaces according to the control laws—all without pilot input or involvement.

However, FBW flight control systems are not without their drawbacks. The older mechanical and hydro-mechanical flight control systems tended to fail gradually over time. This made it relatively easy to identify and correct in advance for any such failures. In contrast, the computer-based FBW control systems tend to fail "completely" in that the computer-based system may suddenly "crash" and leave the pilots without the ability to control the aircraft. Thus, typically some type of redundancy is built into a FBW system for safety purposes. For example, three or four computers may be used that are redundantly connected (e.g., in a "triplex" or "quadruplex" configuration) and may even be of different hardware and/or software design to avoid a multiplicity of computer failures at any one time due to a single type of problem. That way if one of these "primary" flight control computers fails, then two or three other "primary" flight control computers are likely still operational and at least one of them can control the aircraft. Also, redundant computers having reduced computer computational capacity (as compared to the "primary" flight computers) may be used to control the aircraft (albeit with perhaps reduced control capacity—typically known as "secondary" flight computers) in the event of failure of all of the "primary" flight computers. A FBW system may even have a mechanical flight control system as a backup in case of a failure of the flight control computers.

Each primary and/or secondary flight control computer may have at least two or more separate processor "channels" or "lanes," where each channel or lane has a processor that processes the aircraft control laws. That is, each channel processor is responsive to the various aircraft input signals and provides corresponding flight control surface position command output signals to the actuators or other mechanisms associated with various aircraft flight control surfaces. Thus, the channel processors may be considered to be running in parallel. If the processor in each channel or lane is operating correctly, then the output signals from all of the channel processors should be identical. Any discrepancy in the output signals from the two or more channels or lanes may be interpreted as a failure of that particular flight control computer.

The processors within the channels may be of a different hardware and/or software design (e.g., dissimilar control law algorithms), to reduce the risk that a particular type of processor hardware or software failure will simultaneously affect the processors in all of the channels or lanes thereby rendering failure detection by comparison of outputted signals not possible as the failure could be identical in both channels or lanes.

While it common for the channel processors to have some type of testing performed on them at certain times during operation (e.g., at start up, periodically, pilot-initiated, etc.) to check if they are functioning properly, there is a type of error that is unknown and, if it occurs and left uncontained, could cause a dangerous condition for the aircraft. This type of unknown error is typically referred to as a software "residual" error, and is generally a type of unknown error in the software that embodies the aircraft flight control system control laws. Also, this type of error does not manifest itself in testing of the channel processors prior to being placed into operation on an aircraft. Instead, a residual error usually only manifests itself during actual aircraft operation. As such, it is of utmost importance to recognize the occurrence of such an error and to contain it as fast as possible.

In the past it has been known to have the channel or lane processors run dissimilar software as between each processor in an attempt to sense a residual software error. For example, it is known to use two different groups of software programmers to write the software code that implements the desired functionality of the channel processors—one group of programmers for each processor. This inherently results in two different sets of executable software code being developed, with the resulting two different sets of code being executed by the two channel processors.

It is also known to have one software code written for the two channel or lane processors. However, if the code is compiled by two different compilers, the result again is two different sets of code, which can be executed by the two channel processors.

In either case of the different software codes described above, the two channel or lane processors have their flight control surface position command output signals compared for any discrepancy or difference therebetween, and, thus for an abnormality in the form of a "residual" error. If such an abnormality exists, then steps can be taken, for example, to remove the exercise of control over the flight control logic by that flight control computer having the abnormality and replace it with one of the remaining operational redundant flight control computers within the overall FBW flight control system. Generally, because of the nature of the residual error embedded in the flight control software, no attempt is made to debug or fix the residual software error "on the fly" while the now defective flight control computer is still operational with the aircraft in flight.

What is needed is an improved aircraft flight control system that monitors various sensed actual input signal values and/or pilot commanded input signal values of each of more than one aircraft flight parameter using one of at least two different flight system computer channels or lanes to check for abnormal flight system computer operation in the form of a residual software error in the commanded output signal for each of the more than one aircraft flight parameter.

SUMMARY OF THE INVENTION

According to an embodiment of the present invention, a flight control system for an aircraft includes at least two flight control computers at least one of which is utilized at any one time to control flight of the aircraft, each of the at least two flight control computers having at least two processors, each of the at least two processors being responsive to an aircraft input signal indicative of at least one of a plurality of aircraft flight parameters and being responsive to control laws to provide a control output command signal indicative of a desired control of a flight control surface of an aircraft. Also, wherein at least one of the at least two processors for each of the at least two flight control computers comprises an abnormal response monitor that is responsive to the aircraft input signal indicative of at least one of a plurality of aircraft flight parameters to determine whether the control output command signal is within an acceptable value.

In an advantageous embodiment of the present invention, if it is determined that the control output command signal is not within an acceptable value, then the one of the at least two flight control computers in which it is determined that the control output command signal is not within an acceptable value is disabled from being allowed to control flight of the aircraft.

In an advantageous embodiment of the present invention, the aircraft input signal is indicative of a pitch of the aircraft.

In an advantageous embodiment of the present invention, the aircraft input signal includes at least one from the group comprising a pitch angle, an amount of deflection of an elevator on the aircraft, and a normal acceleration of the aircraft.

In an advantageous embodiment of the present invention, the aircraft input signal is indicative of a roll of the aircraft.

In an advantageous embodiment of the present invention, the aircraft input signal includes at least one from the group comprising a roll angle, an amount of deflection of an aileron on the aircraft, and a normal acceleration of the aircraft In an advantageous embodiment of the present invention, the flight control system comprises a fly-by-wire aircraft flight control system.

According to another embodiment of the present invention, a method is disclosed for determining the existence of a residual error in a control output command signal indicative of a desired control of a flight control surface of an aircraft. The method includes sensing an aircraft input signal indicative of at least one of a plurality of aircraft flight parameters. The method further includes determining, from the sensed aircraft input signal, whether the control output command signal is within an acceptable value.

In an advantageous embodiment of the present invention, if it is determined that the control output command signal is not within an acceptable value, then one of at least two flight control computers for the aircraft in which it is determined that the control output command signal is not within an acceptable value is disabled from being allowed to control flight of the aircraft.

In an advantageous embodiment of the present invention, the sensed aircraft input signal is indicative of a pitch of the aircraft.

In an advantageous embodiment of the present invention, the sensed aircraft input signal includes at least one from the group comprising a pitch angle, an amount of deflection of an elevator on the aircraft, and a normal acceleration of the aircraft.

In an advantageous embodiment of the present invention, the sensed aircraft input signal is indicative of a roll of the aircraft.

In an advantageous embodiment of the present invention, the sensed aircraft input signal includes at least one from the group comprising a roll angle, an amount of deflection of an aileron on the aircraft, and a normal acceleration of the aircraft.

In an advantageous embodiment of the present invention, the flight control system comprises a fly-by-wire aircraft flight control system.

According to yet another embodiment of the present invention, a computer program product is disclosed for determining the existence of a residual error in a control output command signal indicative of a desired control of a flight control surface of an aircraft. The computer program product comprises a transitory or non-transitory computer readable storage medium having program code embodied therewith, the program code readable/executable by a computer, processor or logic circuit to perform a method that includes sensing an aircraft input signal indicative of at least one of a plurality of aircraft flight parameters. The method further includes determining, from the sensed aircraft input signal, whether the control output command signal is within an acceptable value.

In an advantageous embodiment of the present invention, if it is determined that the control output command signal is not within an acceptable value, then one of at least two flight control computers for the aircraft in which it is determined that the one or more control output command signal is not within an acceptable value is disabled from being allowed to control flight of the aircraft.

In an advantageous embodiment of the present invention, the sensed aircraft input signal is indicative of a pitch of the aircraft.

In an advantageous embodiment of the present invention, the sensed aircraft input signal includes at least one from the group comprising a pitch angle, an amount of deflection of an elevator on the aircraft, and a normal acceleration of the aircraft.

In an advantageous embodiment of the present invention, the sensed aircraft input signal is indicative of a roll of the aircraft.

In an advantageous embodiment of the present invention, the sensed aircraft input signal includes at least one from the group comprising a roll angle, an amount of deflection of an aileron on the aircraft, and a normal acceleration of the aircraft.

In an advantageous embodiment of the present invention, the flight control system comprises a fly-by-wire aircraft flight control system.

Embodiments of the present invention provide for the reliable detection of residual errors within the flight control software that runs on or is executed by two channel processors, within each flight control computer in a fly-by-wire aircraft flight control system, where the two channel processors differ from each other in their hardware composition. Once a residual error is detected, then that particular flight control computer can be disabled as the flight control computer currently executing the flight control software and another one of the remaining redundant flight control computers can take over as the primary flight control computer then currently executing the flight control software.

BRIEF DESCRIPTION OF THE DRAWINGS

The various embodiments of the present invention can be understood with reference to the following drawings. The components are not necessarily to scale. Also, in the drawings, like reference numerals designate corresponding parts throughout the several views.

DETAILED DESCRIPTION OF THE INVENTION

The present invention is more particularly described in the following description and examples that are intended to be illustrative only since numerous modifications and variations therein will be apparent to those skilled in the art. As used in the specification and in the claims, the singular form "a," "an," and "the" may include plural referents unless the context clearly dictates otherwise. Also, as used in the specification and in the claims, the term "comprising" may include the embodiments "consisting of" and "consisting essentially of." Furthermore, all ranges disclosed herein are inclusive of the endpoints and are independently combinable.

As used herein, approximating language may be applied to modify any quantitative representation that may vary without resulting in a change in the basic function to which it is related. Accordingly, a value modified by a term or terms, such as "about" and "substantially," may not to be limited to the precise value specified, in some cases. In at least some instances, the approximating language may correspond to the precision of an instrument for measuring the value.

In embodiments of the present invention, a flight control system for an aircraft includes at least two flight control computers at least one of which is utilized at any one time to control flight of the aircraft, each of the at least two flight control computers having at least two processors, each of the at least two processors being responsive to an aircraft input signal indicative of at least one of a plurality of aircraft flight parameters and being responsive to control laws to provide a control output command signal indicative of a desired control of a flight control surface of an aircraft. Also, at least one of the at least two processors for each of the at least two flight control computers comprises an abnormal response monitor that is responsive to the aircraft input signal indicative of at least one of a plurality of aircraft flight parameters to determine whether the control output command signal is within an acceptable value.

The foregoing and other features of various disclosed embodiments of the invention will be more readily apparent from the following detailed description and drawings of the illustrative embodiments of the invention wherein like reference numbers refer to similar elements.

Figure 1:
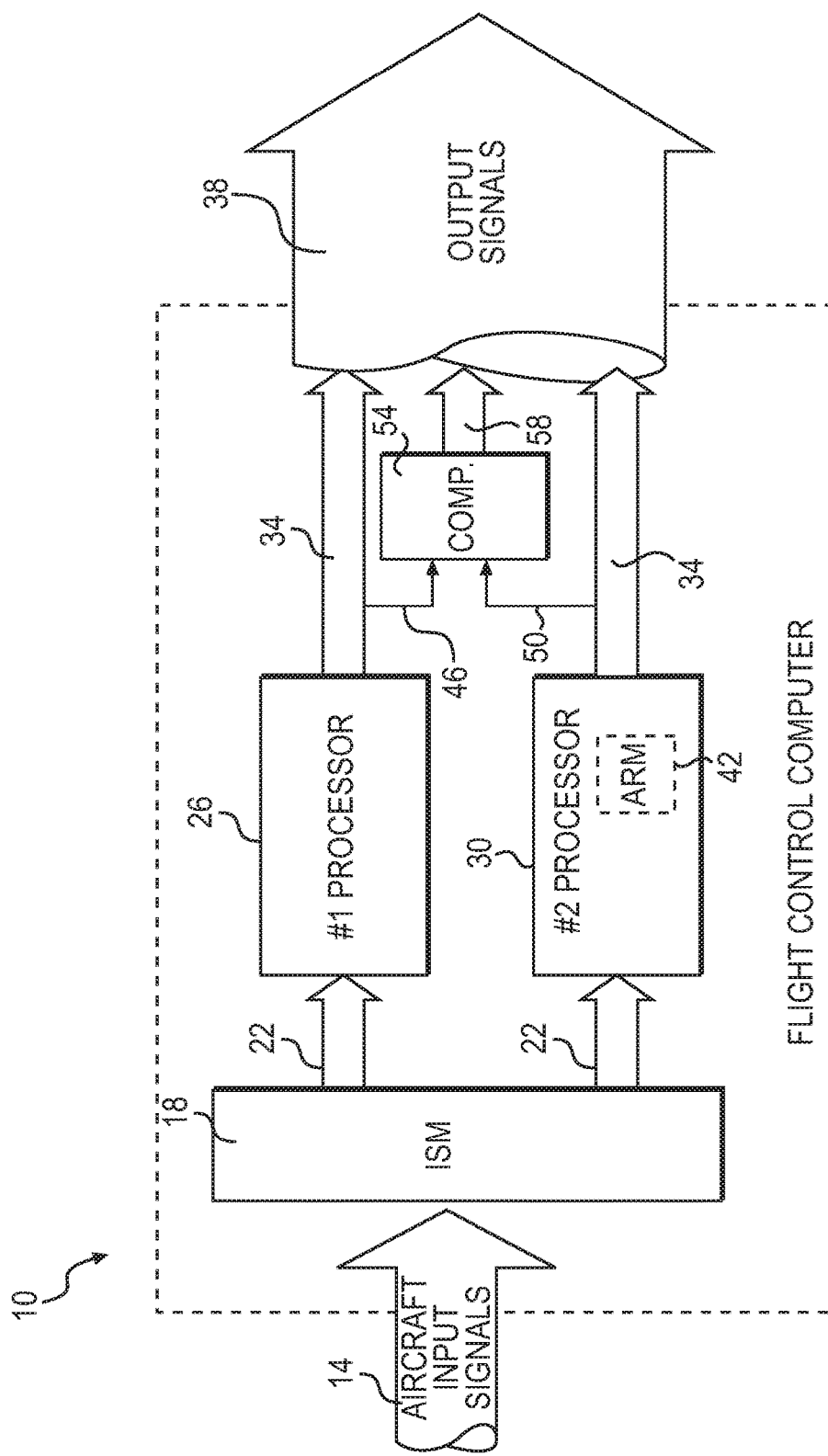
FIG. 1 is a block diagram of a portion of a flight control computer that implements the abnormal response monitor of embodiments of the present invention.

Referring to FIG. 1, there illustrated is a block diagram of a portion of a flight control computer 10 that implements the abnormal response monitor of embodiments of the present invention. The flight control computer 10 illustrated in FIG. 1 may be one of a plurality (e.g., three or four) of similar such computers 10 that are connected in a redundant, parallel manner, thereby providing a measure of safety for the overall aircraft flight control system that the computers 10 are a part of. That is, if one of the computers 10 is determined to be faulty or inoperative, and that faulty computer was functioning as the primary operational flight control computer at a particular point in time, then one of the other computers that is operational and not faulty at that time may instead take over the control of the aircraft. Although not necessary for the broadest embodiments of the present invention, the flight control computers 10 may be part of a fly-by-wire ("FBW") flight control system, as discussed hereinabove in the "BACKGROUND OF THE INVEN- TION" section. However, aircraft flight control systems other than FBW systems may contain embodiments of the present invention.

Also the flight control computer 10 illustrated in FIG. 1 may be part of the "primary" flight control system for the aircraft. Oftentimes, modern aircraft have a "primary" flight control system comprised of a plurality of redundant devices (e.g., computers 10), as well as one or more "secondary" flight control systems. Each "secondary" flight control system may also comprise one or more computers. Yet, it is common for the computers that are part of a "secondary" flight control system for an aircraft to have a relatively reduced control capability, as compared to a "primary" flight control system for an aircraft. Nevertheless, embodiments of the present invention may reside in such "secondary" flight control systems, in light of the teachings herein.

Still referring to FIG. 1, there illustrated is the flight control computer 10 having input thereto a plurality of aircraft signals on a bus 14. These input signals on the bus 14 may be provided by, or originate from, in typical fashion, for example, from manually, pilot-initiated devices located in the cockpit such as the pilot and co-pilot sidestick controllers or yokes, the rudder pedals, various switches, etc. The input signals on the bus 14 may also come from various sensors disposed at various locations (e.g., the air data system) on the aircraft, or from various other aircraft subsystems (e.g., the avionics system which may also supply signals from the aircraft autopilot subsystem).

The input signals on the bus 14 may be connected with one or more input signal management ("ISM") modules or logic blocks 18, each of which may provide various types of known signal conditioning (e.g., input signal data validity checking and validity bit insertion, consolidation, etc.) to the various aircraft signals on the bus 14. The conditioned signals are output from the ISM module 18 on one or more signal lines or busses 22 to two processors 26, 30 (e.g., "#1 Processor," "#2 Processor"). The signals on the busses 22 may be identical as between the two busses 22. As such, in embodiments of the present invention the two ISM modules 18 may be identical as well so as to provide the identical signals on the busses 22.

In accordance with embodiments of the present invention, the two processors 26, 30 may be of dissimilar hardware design, yet their functionality may be identical. That is, the two processors 26, 30 may be operable in response to the aircraft input signals on the busses 22, and to the various aircraft control laws ("CLAWS") preprogrammed and stored in memory associated with the respective processor 26, 30, to compute, in parallel without any overlap (i.e., the processors 26, 30 are segregated), the aircraft flight control surface position command output signals. Thus, the processors 26, 30 may be considered to reside in separate "channels" or "lanes" that are separate from one another. As such, they are typically not allowed to exchange data with one another.

The output signals from each processor 26, 30 may be provided on output signal busses 34. As the two processors 26, 30 are performing the identical computations (albeit with different hardware designs as between the processors 26, 30), the processor output signals on the busses 34 are normally identical as well, assuming both processors 26, 30 are functioning properly. These two signal busses 34 may then become part of a larger signal bus 38 that is provided to other parts of the aircraft flight control system.

In accordance with embodiments of the present invention, an abnormal aircraft response monitor ("ARM") is provided as part of each of the flight control computers 10. The ARM 42 may be provided as logic that is part of one of the two processors 26, 30. As shown in FIG. 1, in accordance with embodiments of the present invention, the ARM 42 may be provided as part of the #2 Processor 30. More specifically, and according to embodiments of the present invention, the ARM 42 may be embodied as software executed by that processor 30. However, it should be understood that the ARM may be embodied in the #1 processor 26, instead.

The primary function of the ARM logic 42 is to determine if the CLAWS in each processor 26, 30 are providing the correct control output command signal to the associated aircraft flight control surface to achieve the desired aircraft performance with respect to various aircraft flight parameters such as pitch and roll. That is, the ARM logic 42 functions to insure that there are no residual software errors in the CLAWS. The ARM logic 42 accomplishes this task by monitoring various aircraft input signals 14 after they pass through the ISM module 18 for the #2 processor 30. If desired, and in accordance with embodiments of the present invention, a separate ISM module 18 may be utilized only for the aircraft input signals 14 that are utilized by the ARM logic 42 within the #2 processor 30. As such, another ISM module 18 may be dedicated to the remainder of the #2 processor 30. This further reduces the chance that a residual error may occur if a single ISM 18 was utilized for the entire functionality of the #2 processor 30. The ISM module 18 dedicated to the ARM logic 42 and the ISM module 18 dedicated to the remainder of the #2 processor 30 may be structured on separate software "partitions" independent of one another.

Specific examples of various aircraft flight parameters such as pitch and roll used with the ARM logic 42 in embodiments of the present invention are described in more detail hereinafter with respect to FIGS. 2 and 3.

Still referring to FIG. 1, one or more control output command signals on lines 46, 50 may be branched off of each of the processor output busses 34 from the respective processors 26, 30 and provided to logic 54 that compares each of the corresponding one or more signals on the lines 46, 50 to see if they are identical or not. Since as described hereinabove the two processors 26, 30 are running in parallel, if the processors are operating correctly then each of the corresponding one or more signals on the lines 46, 50, representative of a particular aircraft parameter, e.g., pitch, should be identical as determined by the comparator logic 54. If any one pair of the one or more signals on the lines 46, 50 from the respective processors 26, 30 are not identical (i.e., there is a difference between each other greater than a certain amount), then the comparator logic 54 detects this difference and provides one or more signals on lines 58 that become part of the output signals 38 provided by the flight control computer 10 to other parts of the flight control system. In this case, it is typical to then conclude that the particular flight control computer 10 with the dissimilar output signals on the lines 46, 50 is not functioning properly. As a result, control of the aircraft may then be transferred over to another one of the flight control computers 10 that is properly functioning at that particular time.

The comparator logic 54 is shown in FIG. 1 as being separate from the two processors 26, 30. However, it should be understood that the comparator logic 54 may be implemented in one or both of the processors 26, 30.

It should be noted that there may be a situation that occurs where an identical residual error occurs with both the #1 processor 26 and the #2 processor 30 with respect to a particular aircraft parameter. If this happens, the comparator logic 54 will not be able to properly recognize the problem because the corresponding signals on the lines 46, 50 from the respective processors 26, 30 will be the same, although both signals will be in error. This could lead to a potentially dangerous situation for the aircraft.

However, the abnormal response monitor ("ARM") logic 42 of the present invention will recognize and identify this error situation. This is because the ARM logic 42, since it resides in only one of the two processors 26, 30, will recognize the problem from the control law command output signals coming from the control laws ("CLAWS") section of the processor 26, 30 in which the ARM logic 42 is embodied. Thus, in an embodiment, only one of the processors 26, 30 has the ARM logic 42 embodied therein. However, it should be understood that other embodiments contemplate both processors 26, 30 (or all of the processors, however many there are) as each having the ARM logic 42 embodied therein. In this case, each processor 26, 30 may also include some type of logic (e.g., comparator logic) to determine if a residual error has occurred in the control law command output signals. Each processor 26, 30 having this residual error determining logic may replace the comparator logic 54 shown in the embodiment of FIG. 1.

When the ARM logic 42 recognizes a residual error situation from the sensed aircraft signals 14, the most likely cause for such an error is a residual (i.e., "unknown") error residing in the control law software being executed by the #1 processor 26 and/or the #2 processor 30.

Figure 2:
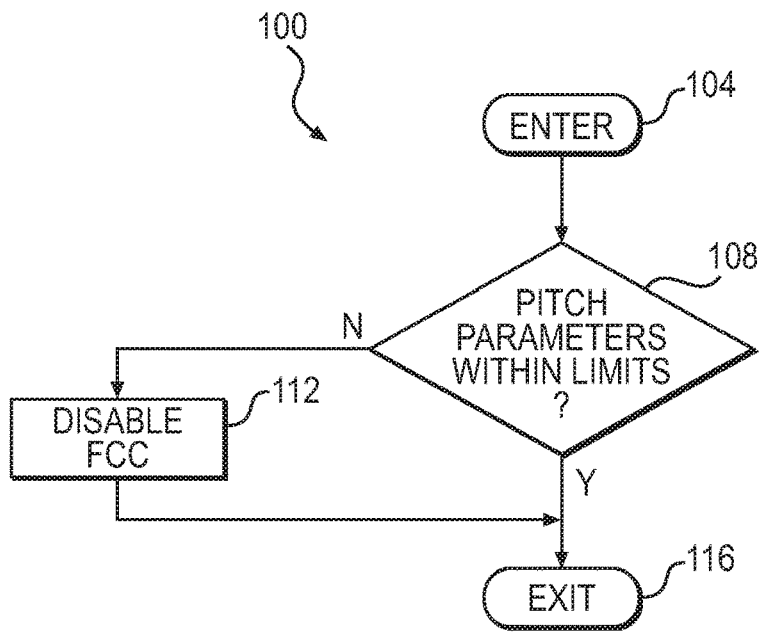
FIG. 2 is a is a flowchart of exemplary steps executed by a processor in a method for carrying out the abnormal response monitor for an exemplary aircraft flight parameter of pitch in accordance with an embodiment of the present invention.

Referring also to FIG. 2, there illustrated is a flowchart of exemplary steps executed by the #2 processor 30 in a method 100 for carrying out the ARM logic 42 for an exemplary aircraft flight parameter of pitch. After an enter step 104, a step 108 is executed in which one or more aircraft flight parameters provided to the ARM logic 42 by the ISM module 18 on the signal lines 22 are checked to see if a residual software error exists as exhibited by the corresponding control output command signal from the CLAWS within the processor 30. The existence of such an error will normally be manifested by the one or more aircraft flight parameters exhibiting a certain behavior; for example exceeding a threshold value for a predetermined period of time. Depending upon the aircraft flight parameter being checked for a residual error (e.g., aircraft pitch in the method 100 of FIG. 2), the step 108 can be executed as one step or as a series of steps. In the latter case, typically each step 108 in the series is carried out sequentially and an "OR" condition exists such that if any one of the steps 108 shows that the aircraft pitch does not meet the conditions set forth in that step, then a step 112 is executed where the flight control computer 10 is deemed to be inoperable or not operating properly and that flight control computer is disabled and replaced for aircraft flight control operation by one of the other redundant flight control computers 10 that is operable at that particular time. In other words, the ARM logic of embodiments of the present invention may be located and be simultaneously functioning within every one of the typical plurality of flight control computers 10, even though only one of the flight control computer 10 is controlling the aircraft at any one point in time.

With regard to aircraft pitch, exemplary checks that may be made in the step 108 to determine if the pitch is being properly commanded by the flight control computer 10 include the pitch angle being above a maximum limit of a certain angular threshold amount for a certain period of time (e.g., a persistence time). Other pitch parameters may include the amount of deflection of the elevators on the aircraft, and the amount of normal acceleration of the aircraft. That is, does the amount of elevator deflection level the aircraft, regardless of pilot input? Also, does the amount of normal acceleration exceed an upper or a lower limit?

If the flight control computer 10 is disabled, then the method 100 exits in a step 116. Similarly, if the various pitch parameters are all within their proper values, then the flight control computer 10 is not disabled and the method 100 exits in the step 116.

Figure 3:
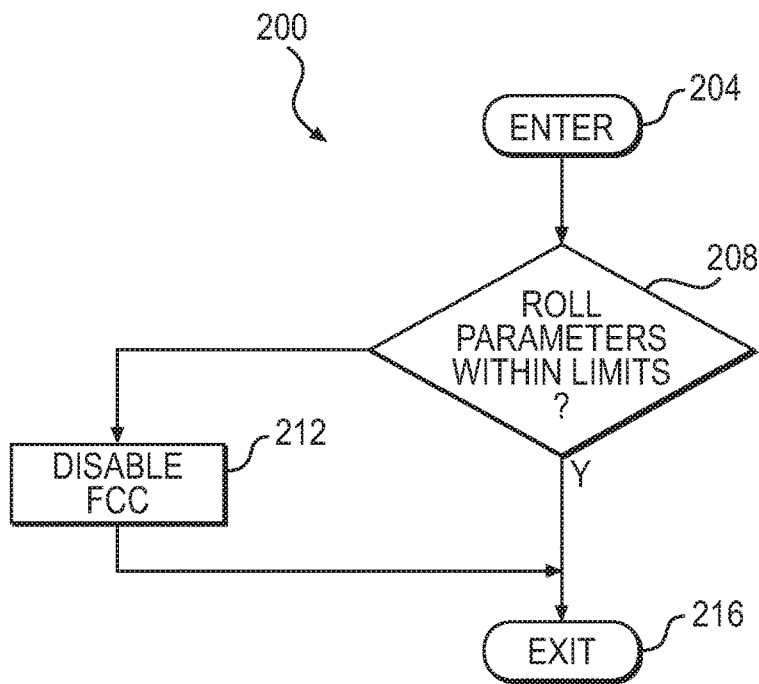
FIG. 3 is a flowchart of exemplary steps executed by a processor in a method for carrying out the abnormal response monitor for an exemplary aircraft flight parameter of roll in accordance with embodiments of the present invention.

Referring to FIG. 3, there illustrated is a flowchart of exemplary steps executed by the #2 processor 30 in a method 200 for carrying out the ARM logic 42 for an exemplary aircraft flight parameter of roll. The method 200 is similar to the method 100 of FIG. 2. After an enter step 204, a step 208 is executed in which various aircraft flight parameters indicative of the roll of the aircraft are checked to see if they are within proper limits as exhibited by the corresponding control output command signal from the CLAWS within the processor 30. Also similar to the method of FIG. 2, this step 208 may be carried out as a series of steps in which an OR function exists between the steps 208 such that if any one of the steps 208 in the series fails, then the flight control computer 10 is disabled in a step 212. These parameters can include an amount of roll angle, and an amount of aileron deflection. A pilot input with respect to the pilot trying to level the aircraft may also be taken into account.

If the flight control computer 10 is disabled in the step 212, then the method 200 exits in a step 216. Similarly, if the various roll parameters are all within their proper values, then the flight control computer 10 is not disabled and the method 200 exits in the step 216.

Other aircraft flight parameters besides pitch and roll, such as yaw, may be utilized in conjunction with the ARM logic 42 in other embodiments of the present invention, in light of the teachings herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more transitory or non-transitory computer readable medium(s) having computer readable program code embodied thereon. The computer program product may, for example, be executed by a control system, such as, for example, the #2 processor 30 of FIG. 1.

Any combination of one or more computer readable medium(s) may be utilized. The computer readable medium may be a computer readable signal medium or a transitory or non-transitory computer readable storage medium. A transitory or non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer (e.g., the #2 processor 30 of FIG. 1), other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

What is claimed is:

1. A flight control system for an aircraft, comprising:
at least two flight control computers at least one of which is utilized at any one time to control flight of the aircraft, each of the at least two flight control computers having at least two processors, each of the at least two processors being responsive to an aircraft input signal indicative of at least one of a plurality of aircraft flight parameters, each of the at least two processors computing in parallel and providing a control output command signal indicative of a desired control of a flight control surface of the aircraft based on control laws;
wherein:
at least one of the at least two processors for each of the at least two flight control computers comprises an abnormal response monitor configured to detect a residual error in software that embodies the control laws by being responsive to the aircraft input signal indicative of at least one of a plurality of aircraft flight parameters and determining whether the control output command signal is within an acceptable value for the control output command; and
when the abnormal response monitor detects the residual error in the software by determining that the control output signal command is not within the acceptable value, then the one of the at least two flight control computers in which it is determined that the control output command signal is not within the acceptable value is disabled from being allowed to control flight of the aircraft.

2. The flight control system of claim 1, wherein the aircraft input signal is indicative of a pitch of the aircraft.

3. The flight control system of claim 2, wherein the aircraft input signal includes at least one from the group comprising a pitch angle, an amount of deflection of an elevator on the aircraft, and a normal acceleration of the aircraft.

4. The flight control system of claim 1, wherein the aircraft input signal is indicative of a roll of the aircraft.

5. The flight control system of claim 4, wherein the aircraft input signal includes at least one from the group comprising a roll angle, an amount of deflection of an aileron on the aircraft, and a normal acceleration of the aircraft.

6. The flight control system of claim 1, wherein the flight control system comprises a fly-by-wire aircraft flight control system.

7. A method for determining the existence of a residual error in software that embodies control laws used to generate a control output command signal indicative of a desired control of a flight control surface of an aircraft, the method comprising:
providing at least two flight control computers at least one of which is utilized at any one time to control flight of the aircraft, each of the at least two flight control computers having at least two processors, each of the at least two processors being responsive to an aircraft input signal indicative of at least one of a plurality of aircraft flight parameters, each of the at least two processors computing in parallel and providing a control output command signal indicative of a desired control of a flight control surface of the aircraft based on the control laws, wherein at least one of the at least two processors for each of the at least two flight control computers comprises an abnormal response monitor configured to detect the residual error in the software;

sensing, using said abnormal response monitor, the aircraft input signal indicative of at least one of a plurality of aircraft flight parameters;

determining, from the sensed aircraft input signal, whether the control output command signal is within an acceptable value for the control output command; and when the residual error in the software is detected by determining that the control output command signal is not within an acceptable value, then the one of at least two flight control computers for the aircraft in which it is determined that the control output command signal is not within an acceptable value is disabled from being allowed to control flight of the aircraft.

8. The method of claim 7, wherein the sensed aircraft input signal is indicative of a pitch of the aircraft.

9. The method of claim 8, wherein the sensed aircraft input signal includes at least one from the group comprising a pitch angle, an amount of deflection of an elevator on the aircraft, and a normal acceleration of the aircraft.

10. The method of claim 7, wherein the sensed aircraft input signal is indicative of a roll of the aircraft.

11. The method of claim 10, wherein the sensed aircraft input signal includes at least one from the group comprising a roll angle, an amount of deflection of an aileron on the aircraft, and a normal acceleration of the aircraft.

12. The method of claim 7, wherein the flight control system comprises a fly-by-wire aircraft flight control system.

13. A computer program product for a flight control system for an aircraft, the flight control system comprising at least two flight control computers at least one of which is utilized at any one time to control flight of the aircraft, each of the at least two flight control computers having at least two processors, each of the at least two processors being responsive to an aircraft input signal indicative of at least one of a plurality of aircraft flight parameters, each of the at least two processors computing in parallel and providing a control output command signal indicative of a desired control of a flight control surface of the aircraft based on control laws, wherein at least one of the at least two processors for each of the at least two flight control computers comprises an abnormal response monitor for determining the existence of a residual error in software that embodies the control laws used to generate the control output command signal indicative of a desired control of a flight control surface of the aircraft, the computer program product comprising a non-transitory computer readable storage medium having program code embodied therewith, the program code readable/executable by a computer, processor or logic circuit to perform a method comprising:

sensing, using the abnormal response monitor, the aircraft input signal indicative of at least one of a plurality of aircraft flight parameters;

determining, from the sensed aircraft input signal, whether the control output command signal is within an acceptable value for the control output command; and when the residual error in the software is detected by determining that the control output command signal is not within an acceptable value, then the one of at least two flight control computers for the aircraft in which it is determined that the control output command signal is not within an acceptable value is disabled from being allowed to control flight of the aircraft.

14. The computer program product of claim 13, wherein the sensed aircraft input signal is indicative of a pitch of the aircraft.

15. The computer program product of claim 14, wherein the sensed aircraft input signal includes at least one from the group comprising a pitch angle, an amount of deflection of an elevator on the aircraft, and a normal acceleration of the aircraft.

16. The computer program product of claim 13, wherein the sensed aircraft input signal is indicative of a roll of the aircraft.

17. The computer program product of claim 16, wherein the sensed aircraft input signal includes at least one from the group comprising a roll angle, an amount of deflection of an aileron on the aircraft, and a normal acceleration of the aircraft.

18. The computer program product of claim 13, wherein the flight control system comprises a fly-by-wire aircraft flight control system.

* * * * *